(12) United States Patent
Furukawa

(10) Patent No.: US 10,490,107 B2
(45) Date of Patent: Nov. 26, 2019

(54) SECRET CALCULATION DEVICE, METHOD, RECORDING MEDIUM, AND SECRET CALCULATION SYSTEM

(71) Applicant: NEC Corporation, Tokyo (JP)

(72) Inventor: Jun Furukawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 211 days.

(21) Appl. No.: 15/512,393

(22) PCT Filed: Jul. 9, 2015

(86) PCT No.: PCT/JP2015/003455
§ 371 (c)(1),
(2) Date: Mar. 17, 2017

(87) PCT Pub. No.: WO2016/042693
PCT Pub. Date: Mar. 24, 2016

(65) Prior Publication Data
US 2017/0278433 A1    Sep. 28, 2017

(30) Foreign Application Priority Data
Sep. 19, 2014   (JP) .................................. 2014-191151

(51) Int. Cl.
*G09C 1/00*   (2006.01)
*H04L 9/08*   (2006.01)

(52) U.S. Cl.
CPC ................ *G09C 1/00* (2013.01); *H04L 9/085* (2013.01); *H04L 2209/04* (2013.01); *H04L 2209/08* (2013.01); *H04L 2209/46* (2013.01)

(58) Field of Classification Search
CPC ................ G09C 1/00; G09C 1/10; G06F 9/00
See application file for complete search history.

(56) References Cited

U.S. PATENT DOCUMENTS

2013/0132723 A1*  5/2013  Gaborit ................... H04L 9/304
                                                              713/171
2015/0227472 A1*  8/2015  Matsuo .................... G09C 1/00
                                                              713/193

FOREIGN PATENT DOCUMENTS

JP          2012-078446 A      4/2012

OTHER PUBLICATIONS

Tal Rabin et al., "Verifiable Secret Sharing and Multiparty Protocols with Honest Majority (Extended Abstract)", STOC, 1989, pp. 73-85.

(Continued)

*Primary Examiner* — Ponnoreay Pich
(74) *Attorney, Agent, or Firm* — Sughrue Mion, PLLC

(57) ABSTRACT

To calculate of an exclusive OR of elements of bits while the bits remain distributed to a plurality of secret calculation devices without communication among the secret calculation devices, and to calculate of an AND of bits with small amounts of communication and calculation while the bits remain distributed, provided is a secret calculation device including a local AND device and an AND redistribution device. The local AND device receives at least two one-bit input elements to produce a first local AND element. The AND redistribution device receives a one-bit mask and a second local AND element acquired by calculating an exclusive OR of the first local AND element and P bits (P is an integer equal to or more than 0), calculates a first OR, and communicates to/from an AND redistribution device of another secret calculation device to produce at least one one-bit output element.

2 Claims, 11 Drawing Sheets

(56) References Cited

OTHER PUBLICATIONS

Oded Goldreich et al., "How to Solve any Protocol Problem—An Efficiency Improvement", CRYPTO, 1987, pp. 73-86.
Ryo Kato et al., "Accelerating Bit-wise Calculation in Multi-party Computation by Partially Using Small Prime", Transactions of Information Processing Society of Japan, Sep. 15, 2014, pp. 1971 to 1991, vol. 55, No. 9.
International Search Report of PCT/JP2015/003455 dated Aug. 11, 2015 [PCT/ISA/210].
Written Opinion of PCT/JP2015/003455 dated Aug. 11, 2015 [PCT/ISA/237].

\* cited by examiner

SECRET CALCULATION DEVICE, METHOD, RECORDING MEDIUM, AND SECRET CALCULATION SYSTEM

CROSS REFERENCE TO RELATED APPLICATIONS

This application is a National Stage of International Application No. PCT/JP2015/003455, filed Jul. 9, 2015, claiming priority based on Japanese Patent Application No. 2014-191151, filed Sep. 19, 2014, the contents of all of which are incorporated herein by reference in their entirety.

TECHNICAL FIELD

This invention relates to a secret calculation device, a method, a recording medium, and a secret calculation system.

BACKGROUND ART

A secret calculation method is a method of calculating a given function by a plurality of secret calculation devices performing calculation while communicating to/from one another. Moreover, the secret calculation method has such a characteristic that none of the secret calculation devices can acquire information on input/output to/from the function unless data to be handled are shared by a sufficient number of devices.

As a publicly known secret calculation method, a method disclosed in Non Patent Document 1 is known.

The method disclosed in Non Patent Document 1 involves distributing a secret S, which is a value in a certain field, to a plurality of devices by using a polynomial F satisfying F(0)=S in this field. It is assumed that when the number of devices is N and the number of secrets is less than K, the information on the input/output to/from the function cannot be acquired. It is also assumed that values of the field that differ depending on the device are assigned, and that the value of the field assigned to the ith device is denoted by X[i], where $1 \leq i \leq N$.

When a secret A is distributed to the plurality of devices, F[i]:=F(X[i]) of a randomly selected (K−1)th-order polynomial F satisfying F(0)=A is distributed to each ith device.

Similarly, for a secret B, G[i]:=G(X[i]) of a (K−1)th-order polynomial G satisfying G(0)=B is distributed to each ith device.

Regarding the secrets, the (K−1)th-order polynomials can be solved by a group of K or more devices. Thus, coefficients of F or G can be acquired, and F(0) or G(0) can consequently be calculated.

In order to calculate a value where A+B is distributed, each ith device calculates H[i]=F[i]+G[i]. This value is H(X[i]) acquired by assigning X[i] to the polynomial H having coefficients, each of which is a sum of corresponding coefficients of F and G, and is thus a value acquired by distributing A+B to the plurality of devices as in the cases of the secret A and the secret B.

As in the cases of the secret A and the secret B, the (K−1)th-order polynomial can be solved by a group of K or more devices. Thus, coefficients of H can be acquired, and H(0) can consequently be calculated.

When $K*2 \leq N+1$, in order to calculate a value where A*B is distributed, each ith device calculates H[i]=F[i]*G[i]. This value is H(X[i]) acquired by assigning X[i] to the 2Kth-order polynomial H(X)=F(X)*G(X), and is thus a value acquired by distributing A*B to the plurality of devices as in the cases of the secret A and the secret B. The order of H is 2K, which is different from the cases of the secret A and the secret B, and hence the 2Kth-order polynomial can be solved by a group of 2K or more devices. Thus, coefficients of H can be acquired, and H(0) can consequently be calculated.

The distribution method for A*B is different from that for the secret A and the secret B. In order to distribute A*B in the form of using the (K−1)th-order polynomial, each ith device generates a (K−1)th-order polynomial G from H[i], and distributes G(X[j]) to each jth device. With the method disclosed in Non Patent Document 1, all functions constructed by sums and products can be calculated in this way.

With the method disclosed in Non Patent Document 1, the addition and the multiplication in the field can easily be calculated, but $2K \leq N+1$ exists as a condition. When K is not equal to or more than 2, a single device can acquire a secret, and N is thus equal to or more than 3.

X[i] needs to be different for each different i, and hence, with the method disclosed in Non Patent Document 1, a Galois field GF(2) is not included in available fields. The Galois field GF(2) is not included, and hence the method disclosed in Non Patent Document 1 cannot use a sum as the exclusive OR.

As another publicly known secret calculation method, a method disclosed in Non Patent Document 2 is known.

Non Patent Document 2 includes a description relating to a method for a case where the number of devices is two. With this method, when two devices hold a bit, namely, an element b in the Galois field GF(2), in a distributed manner, b and c satisfying b+c=b mod 2 are distributed to and held by the respective devices.

With this method, when a certain bit A and a certain bit B are distributed to a device 1 and a device 2, the device 1 holds C and E and the device 2 holds D and F, where A=C+D mod 2 and B=E+F mod 2. On this occasion, an exclusive OR G of the bit A and the bit B is G=A+B mod 2, and the distributions thereof to the device 1 and the device 2 can be H=C+E mod 2 and J=D+F mod 2, respectively.

Each of the devices can calculate the distribution of the exclusive OR of the two distributed values through light calculation without communicating to/from the other device.

Similarly, when the bit A and the bit B are distributed and held, the following calculation is carried out so that the device 1 acquires L and the device 2 acquires M, where L and M are respective distributions of an AND K=A·B of those two bits, that is, satisfy L+M=K mod 2.

The device 1 randomly generates L. On this occasion, M=(C+D)·(E+F)=L mod 2, and the device 1 thus returns the following values to the device 2 without knowing the value of M in accordance with the values D and F held by the device 2. When (D,F)=(0,0), M=(C+0)·(E+0)+L mod 2 is returned. When (D,F)=(0,1), M=(C+0)·(1+E)+L mod 2 is returned. When (D,F)=(1,0), M=(1+C)·(E+0)+L mod 2 is returned. When (D,F)=(1,1), M=(1+C)·(1+E)+L mod 2 is returned.

The device 1 transmits to the device 2 the value dependent on the input to the device 2. The method in which the device 1 cannot know the input to the device 2 is implemented by a technology referred to as oblivious transfer between the device 1 and the device 2. However, this technology generally requires both devices to perform a large amount of calculation and communication.

PRIOR ART DOCUMENTS

Non Patent Document

Non Patent Document 1: Tal Rabin, Michael Ben-Or: Verifiable Secret Sharing and Multiparty Protocols with Honest Majority (Extended Abstract). STOC 1989: 73-85

Non Patent Document 2: Oded Goldreich, Ronen Vainish: How to Solve any Protocol Problem—An Efficiency Improvement. CRYPTO 1987: 73-86

SUMMARY OF THE INVENTION

Problem to be Solved by the Invention

The method disclosed in Non Patent Document 1 requires communication, but enables the calculation of the AND in a distributed manner with a small amount of communication. Moreover, the method disclosed in Non Patent Document 1 requires a small amount of calculation. On the other hand, the method disclosed in Non Patent Document 1 requires communication and some calculation in order to calculate the exclusive OR in a distributed manner as in the case of the calculation of the AND.

The method disclosed in Non Patent Document 2 has such an advantage that the calculation of the exclusive OR in the distributed manner does not involve communication. On the other hand, the method disclosed in Non Patent Document 2 requires communication as well as the calculation for the AND calculation.

In view of the above-mentioned problems of the related art, this invention has an object to provide a secret calculation device, method, recording medium, and secret calculation system for implementing calculation of an exclusive OR of bits, namely, elements in a Galois field GF(2), while the bits remain distributed to a plurality of secret calculation devices without communication among the secret calculation devices, and implementing calculation of an AND of bits with small amounts of communication and calculation while the bits remain distributed.

Means to Solve the Problem

A secret calculation device according to this invention comprises: a local AND device configured to receive at least two one-bit input elements to produce a first local AND element; and an AND redistribution device configured to receive a one-bit mask and a second local AND element acquired by calculating an exclusive OR of the first local AND element and P bits, where P is an integer equal to or more than 0, to calculate a first OR, and to communicate to/from an AND redistribution device of another secret calculation device to produce at least one one-bit output element.

A secret calculation method according to this invention comprises the steps of: receiving at least two one-bit input elements to produce a first local AND element; and receiving a one-bit mask and a second local AND element acquired by calculating an exclusive OR of the first local AND element and P bits, where P is an integer equal to or more than 0, calculating a first OR, and communicating to/from an AND redistribution device of another secret calculation device to produce at least one one-bit output element.

A secret calculation program recorded on a computer-readable recording medium according to this invention causes a computer to implement the functions of: receiving at least two one-bit input elements to produce a first local AND element; and receiving a one-bit mask and a second local AND element acquired by calculating an exclusive OR of the first local AND element and P bits, where P is an integer equal to or more than 0, calculating a first OR, and communicating to/from an AND redistribution device of another secret calculation device to produce at least one one-bit output element.

Effect of the Invention

According to this invention, it is possible to provide the secret calculation device, method, recording medium, and secret calculation system for implementing calculation of an exclusive OR of bits, namely, elements in a Galois field GF(2), while the bits remain distributed to a plurality of secret calculation devices without communication among the secret calculation devices, and implementing calculation of an AND of bits with small amounts of communication and calculation while the bits remain distributed.

MODES FOR EMBODYING THE INVENTION

Example Embodiment 1

Figure 1:
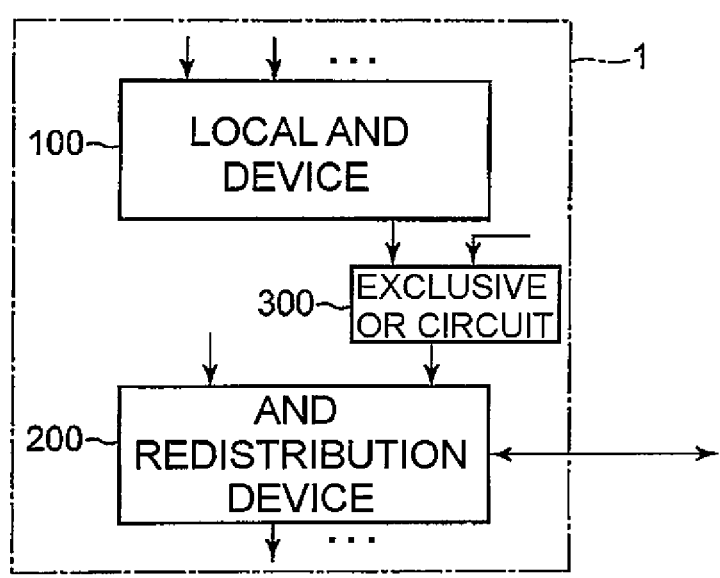
FIG. 1 is a block diagram for illustrating a configuration of a secret calculation device according to a first example embodiment of this invention.

First, referring to FIG. 1, a description is given of a secret calculation device 1 according to a first example embodiment of this invention.

FIG. 1 is a block diagram for illustrating a configuration of the secret calculation device 1. The secret calculation device 1 comprises a local AND device 100, an AND redistribution device 200, and an exclusive OR circuit 300.

The local AND device 100 is configured to receive at least two one-bit input elements to produce a first local AND element. The exclusive OR circuit 300 is configured to calculate an exclusive OR of the first local AND element and P bits (P is an integer equal to or more than 0) to produce a second local AND element. The AND redistribution device 200 is configured to receive a one-bit mask and the second local AND element, to calculate a first OR (exclusive OR), and to communicate to/from an AND redistribution device of another secret calculation device to produce at least one one-bit output element.

The first local AND element may be used as it is as the second local AND element. In this case, namely, in a case where P=0, the exclusive OR circuit 300 may be omitted.

Figure 2:
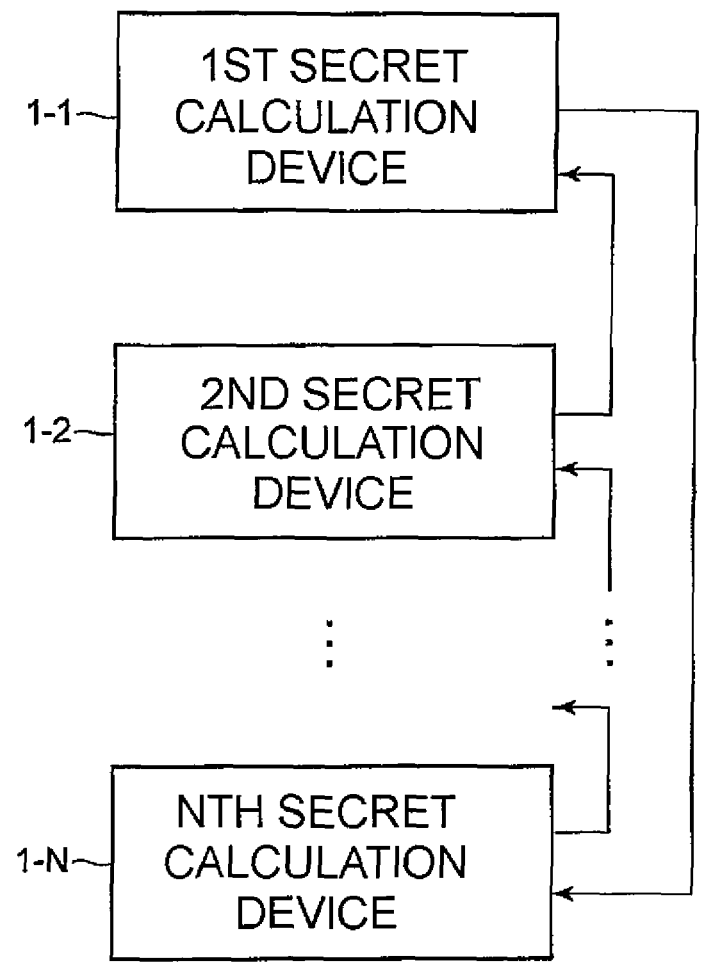
FIG. 2 is a block diagram for illustrating a configuration example of a secret calculation system according to the first example embodiment of this invention.

Referring to FIG. 2, the secret calculation system according to the first example embodiment of this invention comprises N (N is an integer equal to or more than 3) secret calculation devices 1 illustrated in FIG. 1. The N secret calculation devices are referred to as first to Nth secret calculation devices 1-1, 1-2, . . . , 1-N, respectively.

Thus, the first to Nth secret calculation devices 1-1 to 1-N include first to Nth local AND devices and first to Nth AND redistribution devices, respectively, which are not shown.

In this case, the first AND redistribution device of the first secret calculation device 1-1 transmits the first OR to the Nth AND redistribution device of the Nth secret calculation device 1-N. Moreover, the Nth AND redistribution device of the Nth secret calculation device 1-N receives the first OR from the first secret calculation device 1-1. Similarly, an nth (2≤n≤N) AND redistribution device of each nth secret calculation device 1-$n$ transmits the first OR to an (n−1)th AND redistribution device of an (n−1)th secret calculation device 1-($n$−1). Moreover, the (n−1)th AND redistribution device of the (n−1)th secret calculation device 1-($n$−1) receives the first OR transmitted from each nth AND redistribution device of the nth secret calculation device 1-$n$.

In the secret calculation system illustrated in FIG. 2, all of the first to Nth secret calculation devices 1-1 to 1-N are configured to mutually transmit/receive the first ORs. However, all of the secret calculation devices do not need to mutually transmit/receive the first ORs. In other words, any one of the first to Nth secret calculation devices 1-1 to 1-N may be configured to only transmit the first OR, and another one thereof may be configured to only receive the first OR.

In the secret calculation system configured in this way, the exclusive ORs of the bits are calculated while the bit remains distributed among the plurality of secret calculation devices 1-1 to 1-N, and communication is not carried out among those secret calculation devices 1-1 to 1-N. Moreover, with the secret calculation system configured in this way, the AND of bits may also be calculated with small amounts of communication and calculation while the bit remains distributed.

Thus, with the secret calculation system according to the first embodiment, an arbitrary function can be calculated at high speed while the bit remains distributed among the plurality of secret calculation devices 1-1 to 1-N and none of the secret calculation devices 1-1 to 1-N knows data.

Example Embodiment 2

Figure 3:
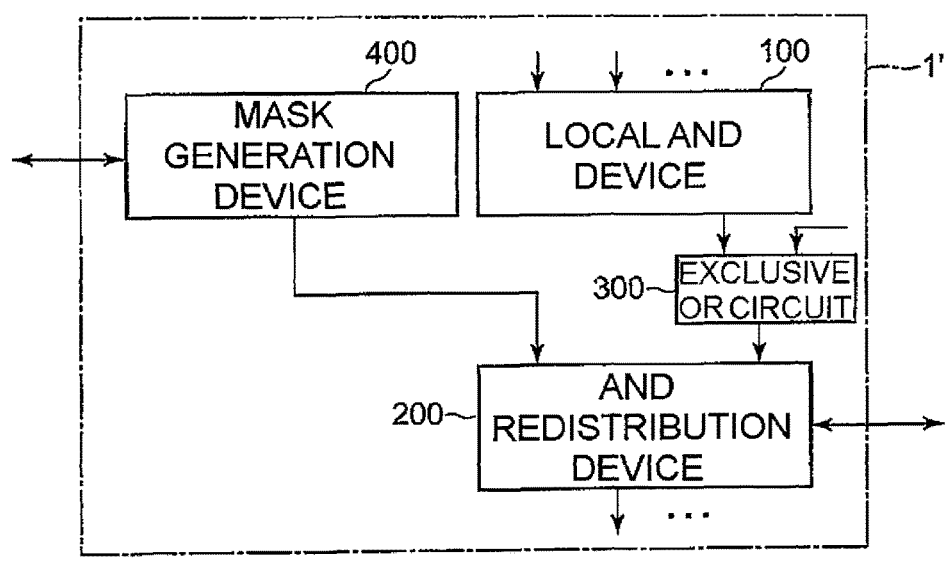
FIG. 3 is a block diagram for illustrating a configuration of a secret calculation device according to a second example embodiment of this invention.

Next, referring to FIG. 3, a description is given of a secret calculation device 1' according to a second example embodiment of this invention.

FIG. 3 is a block diagram for illustrating a configuration of the secret calculation device 1'. The secret calculation device 1' is configured and operates in the same manner as the secret calculation device 1 illustrated in FIG. 1 except that the secret calculation device 1' further includes a mask generation device 400. Thus, components having the same functions as those of the components of FIG. 1 are denoted by the same reference numerals, and a description thereof is omitted for the sake of simplicity.

The mask generation device 400 is configured to communicate to/from a mask generation device of another secret calculation device, and to use a key to generate a random number. One bit selected from this random number is supplied to the AND redistribution device 200 as the above-mentioned mask. As the key, a key generated by the own mask generation device 400 or a received key generated by another mask generation device may be used.

Figure 4:
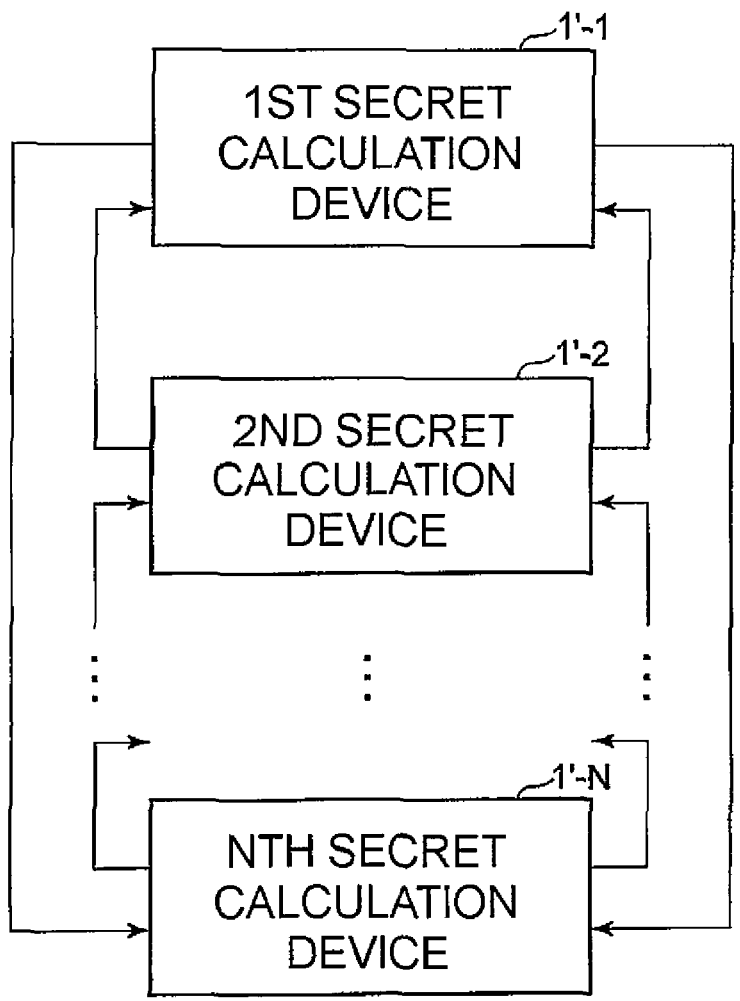
FIG. 4 is a block diagram for illustrating a configuration example of a secret calculation system according to the second example embodiment of this invention.

Referring to FIG. 4, the secret calculation system according to the second example embodiment of this invention comprises N secret calculation devices 1' illustrated in FIG. 3. The N secret calculation devices are referred to as first to Nth secret calculation devices 1'-1, 1'-2, . . . , 1'-N, respectively.

Thus, the first to Nth secret calculation devices 1'-1 to 1'-N include the first to Nth local AND devices, the first to Nth AND redistribution devices, and first to Nth mask generation devices, respectively, which are not shown.

In this case, the first AND redistribution device of the first secret calculation device 1'-1 transmits the first OR to the Nth AND redistribution device of the Nth secret calculation device 1'-N. Further, the nth (2≤n≤N) AND redistribution device of the nth secret calculation device 1'-$n$ transmits the first OR to the (n−1)th AND redistribution device of the (n−1)th secret calculation device 1'-(n−1).

Meanwhile, the first mask generation device of the first secret calculation device 1'-1 transmits the key to the Nth mask generation device of the Nth secret calculation device 1'-N. Further, the nth mask generation device of the nth secret calculation device 1'-$n$ transmits the key to the (n−1)th mask generation device of the (n−1)th secret calculation device 1'-(n−1).

The first to Nth mask generation devices of the first to Nth secret calculation devices 1'-1 to 1'-N receive the transmitted keys, respectively.

In the secret calculation system illustrated in FIG. 4, all of the first to Nth secret calculation devices 1'-1 to 1'-N are configured to mutually transmit/receive the first ORs and the keys. However, all of the secret calculation devices do not need to mutually transmit/receive the first ORs and the keys. In other words, any one of the first to Nth secret calculation devices 1'-1 to 1'-N may be configured to only transmit the first OR, and another one thereof may be configured to only receive the first OR. Further, any one of the first to Nth secret calculation devices 1'-1 to 1'-N may be configured to only transmit the key, and another one thereof may be configured to only receive the key.

In the secret calculation system configured in this way, the exclusive ORs of the bits are calculated while the bit remains distributed among the plurality of secret calculation devices 1'-1 to 1'-N, and communication is not carried out among those secret calculation devices 1'-1 to 1'-N. Moreover, with the secret calculation system configured in this way, the AND of bits may also be calculated with small amounts of communication and calculation while the bit remains distributed.

Thus, with the secret calculation system according to the second example embodiment, an arbitrary function can be calculated at a high speed while the bit remains distributed among the plurality of secret calculation devices 1'-1 to 1'-N, and none of the secret calculation devices 1'-1 to 1'-N knows data.

EXAMPLE

A description will be now given of an Example of this invention. An exclusive OR of a bit R and a bit R' is represented as R+R' mod 2.

Figure 5:
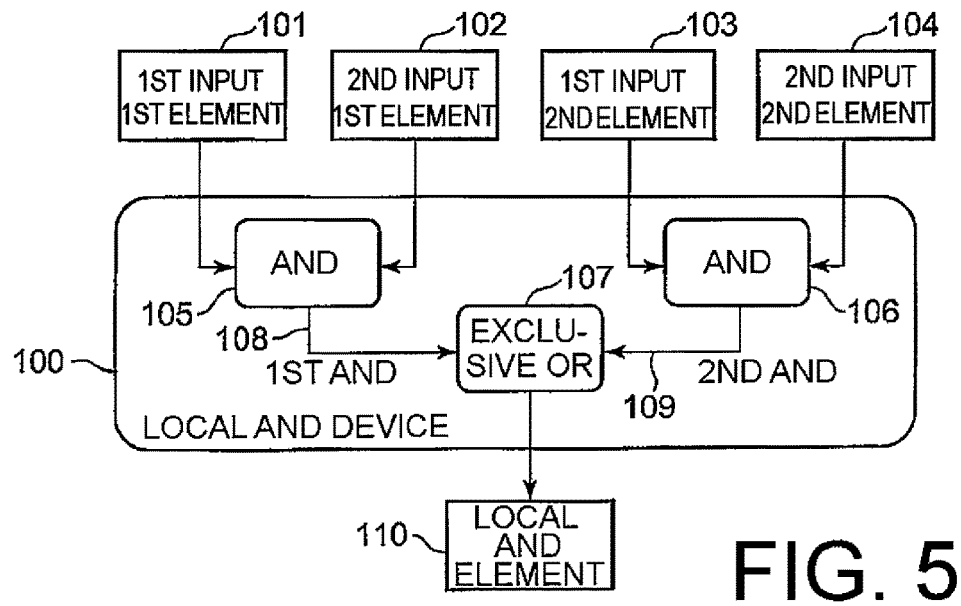
FIG. 5 is a block diagram for illustrating a configuration of a local AND device used in a secret calculation device according to an Example of this invention.

FIG. 5 is a block diagram for illustrating the local AND device 100 according to the Example of this invention used in the secret calculation device 1 illustrated in FIG. 1 or the secret calculation device 1' illustrated in FIG. 3.

The local AND device 100 is supplied with a first input first element 101 of one bit, one bit of a first input second element 103, a second input first element 102 of one bit, and a second input second element 104 of one bit.

The local AND device 100 comprises a first AND circuit 105, a second AND circuit 106, and an exclusive OR circuit 107.

The first AND circuit 105 is configured to calculate an AND of the first input first element 101 and the second input first element 102 to produce a result of the AND as a first AND 108. The second AND circuit 106 is configured to calculate an AND of the first input second element 103 and the second input second element 104 to produce a result of the AND as a second AND 109. The exclusive OR circuit 107 is configured to calculate an exclusive OR of the first AND 108 and the second AND 109 to produce a result of the exclusive OR as a local AND element (first local AND element) 110.

Figure 6:
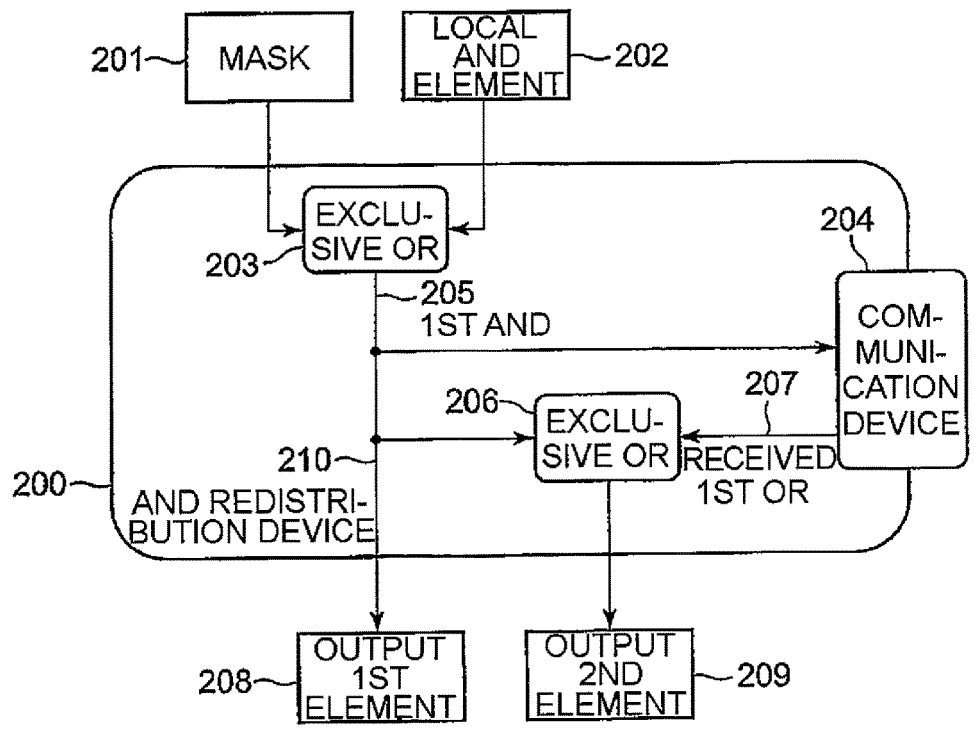
FIG. 6 is a block diagram for illustrating a configuration of an AND redistribution device used in the secret calculation device according to the Example of this invention.

FIG. 6 is a block diagram for illustrating the AND redistribution device 200 according to the Example of this invention used in the secret calculation device 1 illustrated in FIG. 1 or the secret calculation device 1' illustrated in FIG. 3.

The AND redistribution device 200 is supplied with a mask 201 of one bit and a local AND element (second local AND element) 202 of one bit.

The AND redistribution device 200 comprises a first exclusive OR circuit 203, a communication device 204, and a second exclusive OR circuit 206.

The first exclusive OR circuit 203 is configured to calculate an exclusive OR of the mask 201 and the local AND element 202 to produce the exclusive OR as a first OR 205. The communication device 204 is configured to transmit the first OR 205 to the AND redistribution device of another first secret calculation device. Moreover, the communication device 204 is configured to receive, as a received first OR 207, the first OR similarly generated by the AND redistribution device of another second secret calculation device from the AND redistribution device of the second another secret calculation device.

Moreover, the first exclusive OR circuit 203 is configured to produce the first OR 205 as an output first element 208 via a signal line 210. Thus, the signal line 210 serves as means for producing the first OR 205 as the output first element 208.

The second exclusive OR circuit 206 is configured to calculate an exclusive OR of the first OR 205 and the received first OR 207 to produce the result of the exclusive OR as an output second element 209.

The AND redistribution device 200 may be configured to use, as the mask 201, one bit selected from a random number 407 produced by the mask generation device 400 illustrated in FIG. 7 described later.

Figure 7:
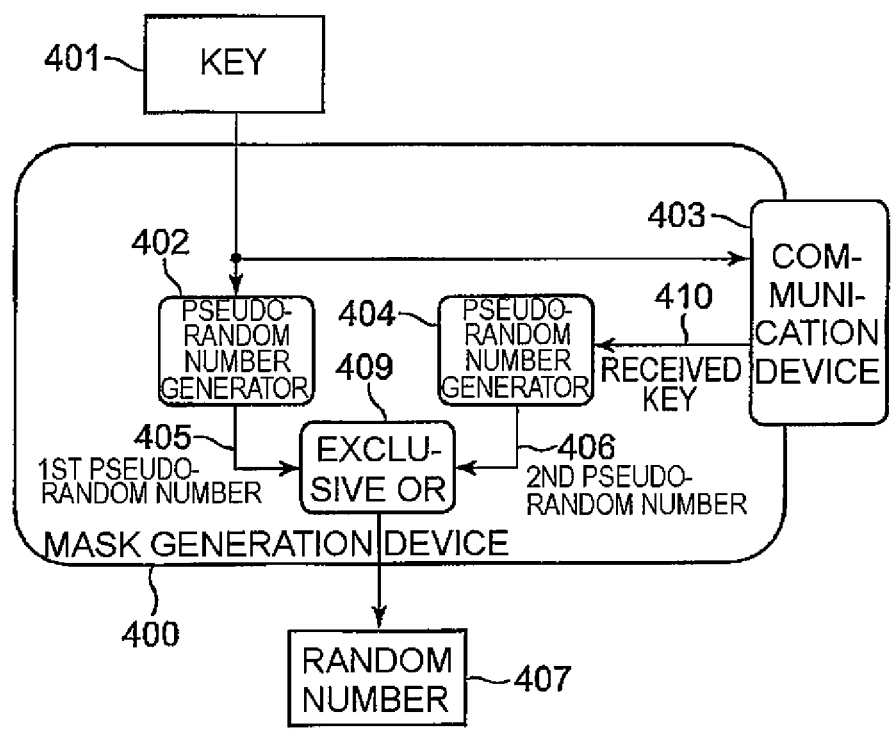
FIG. 7 is a block diagram for illustrating a configuration of a mask generation device used in the secret calculation device according to the Example of this invention.

FIG. 7 is a block diagram for illustrating the mask generation device 400 according to the Example of this invention used in the secret calculation device 1' illustrated in FIG. 3. The mask generation device 400 is also referred to as a random number generation device.

A key 401 is supplied to the mask generation device 400.

The mask generation device 400 comprises a first pseudorandom number generator 402, a communication device 403, a second pseudorandom number generator 404, and an exclusive OR circuit 409.

The first pseudorandom number generator 402 is supplied with the key 401 to generate a first pseudorandom number 405. The communication device 403 is configured to transmit the key 401 to the mask generation device of the first another secret calculation device. Moreover, the communication device 403 is configured to receive, as a received key 410, the key from the mask generation device of the second another secret calculation device. The second pseudorandom number generator 404 is supplied with the received key 410 to generate a second pseudorandom number 406. The exclusive OR circuit 409 is configured to calculate a bitwise exclusive OR of the first pseudorandom number 405 and the second pseudorandom number 409 to produce a result of the exclusive OR as the random number 407.

Figure 8:
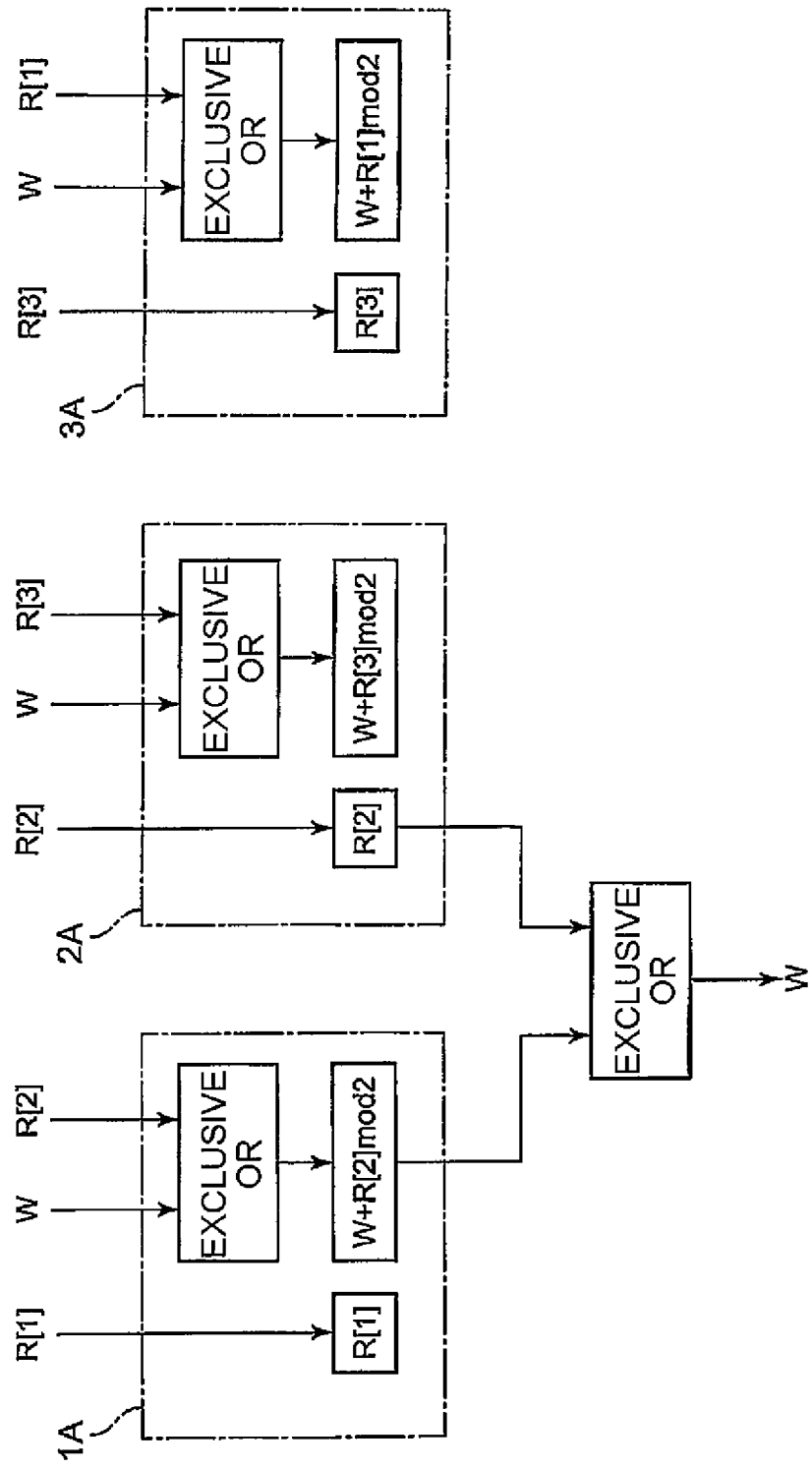
FIG. 8 is a block diagram for illustrating a configuration of the secret calculation system according to the Example, which is capable of restoring a bit W when two out of three secret calculation devices cooperate with each other.

As illustrated in FIG. 8, a secret calculation system according to the Example of this invention comprises three secret calculation devices 1 or 1' illustrated in FIG. 1 or FIG. 3. The three secret calculation devices are referred to as first secret calculation device 1A, second secret calculation device 2A, and third secret calculation device 3A, respectively.

A bit W is distributed to the three secret calculation devices 1A, 2A, and 3A. On this occasion, three randomly selected bits R[1], R[2], and R[3] satisfying R[1]+R[2]+R[3]=0 mod 2 are used. The first secret calculation device 1A stores (R[1],W+R[2] mod 2). The second secret calculation device 2A stores (R[2],W+R[3] mod 2). The third secret calculation device 3A stores (R[3],W+R[1] mod 2).

Two secret calculation devices out of the three secret calculation devices 1A, 2A, and 3A can cooperate with each other to restore the bit W. This restoration can be described without loss of generality for a case where the first secret calculation device 1A and the second secret calculation device 2A cooperate with each other. For example, W+R[2] mod 2 from the first secret calculation device 1A and R[2] from the second secret calculation device 2A are used to calculate W as W=W+R[2]+R[2] mod 2.

(Calculation without Communication of Exclusive OR)

Figure 9:
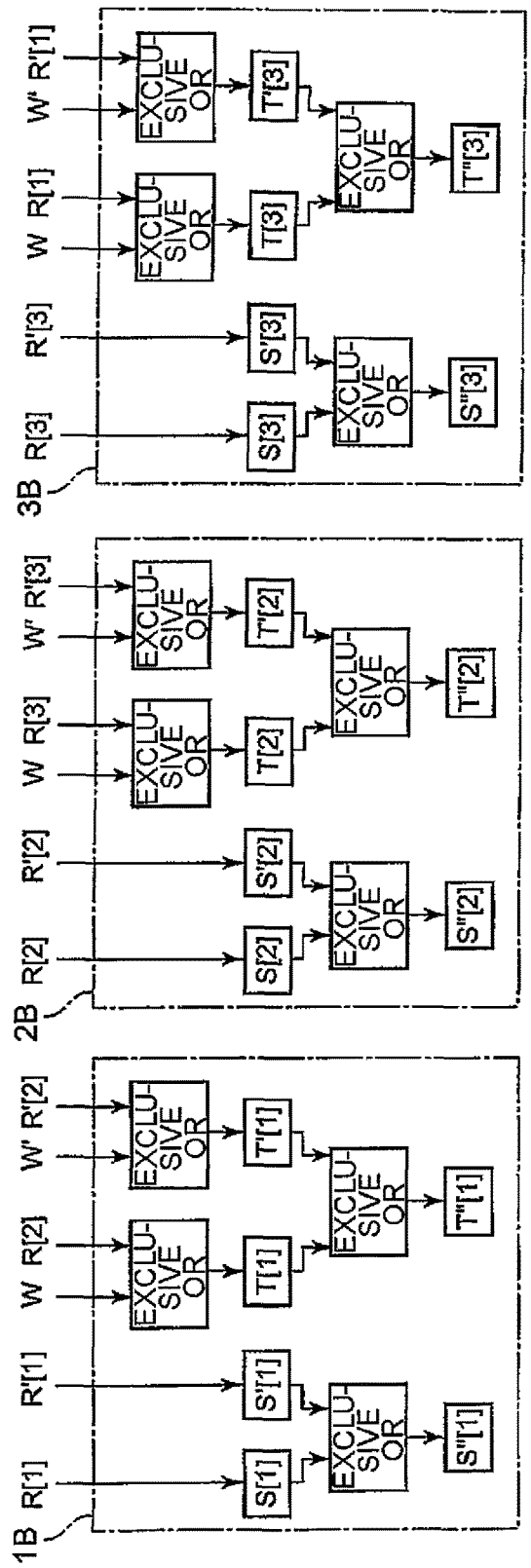
FIG. 9 is a block diagram for illustrating a configuration of the secret calculation system according to the Example for calculating, when the bit W and a bit W' are each distributed, an exclusive OR thereof while the bit W and the bit W' remain distributed.

As illustrated in FIG. 9, a secret calculation system according to the Example of this invention comprises three secret calculation devices 1 or 1' illustrated in FIG. 1 or FIG. 3. The three secret calculation devices are referred to as first secret calculation device 1B, second secret calculation device 2B, and third secret calculation device 3B, respectively.

When the bit W and a bit W' are each distributed, the exclusive OR thereof is calculated as follows while the bit W and the bit W' remain distributed.

The bit W uses three randomly selected bits R[1], R[2], and R[3] satisfying R[1]+R[2]+R[3]=0 mod 2. On this occasion, the first secret calculation device 1B stores (S[1], T[1])=(R[1],W+R[2] mod 2). The second secret calculation device 2B stores (S[2],T[2])=(R[2],W+R[3] mod 2). The third secret calculation device 3B stores (S[3],T[3])=(R[3], W+R[1] mod 2).

The bit W' uses three randomly selected bits satisfying R'[1]+R'[2]+R'[3]=0 mod 2. On this occasion, the first secret calculation device 1B stores (S'[1],T'[1])=(R'[1],W'+R'[2] mod 2). The second secret calculation device 2B stores (S'[2],T'[2])=(R'[2],W'+R'[3] mod 2). The third secret calculation device 3B stores (S'[3],T'[3])=(R'[3],W'+R' [1] mod 2).

On this occasion, the first secret calculation device 1B calculates (S"[1],T"[1])=(S[1]+S'[1] mod 2,T[1]+T'[1] mod 2). The second secret calculation device 2B calculates (S"[2],T"[2])=(S[2]+S'[2] mod 2,T[2]+T'[2] mod 2). The third secret calculation device 3B calculates (S"[3],T"[3])= (S[3]+S'[3] mod 2,T[3]+T'[3] mod 2).

The first secret calculation device 1B, the second secret calculation device 2B, and the third secret calculation device 3B hold the calculation results, respectively, and are thus considered to hold W"=W+W' mod 2 in a distributed manner. From those results, W" can be restored similarly to the original bit W or bit W'.

(Calculation of NOT)

Figure 10:
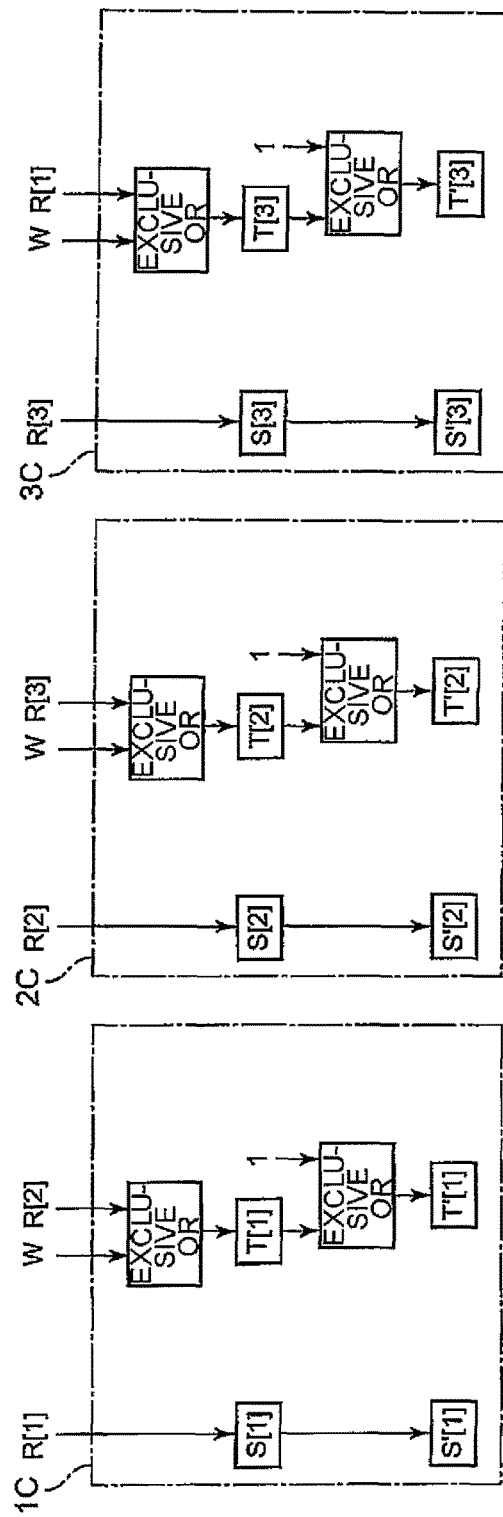
FIG. 10 is a block diagram for illustrating a configuration of the secret calculation system according to the Example for calculating, when the bit W is distributed, a NOT thereof while the bit W remains distributed.

As illustrated in FIG. 10, a secret calculation system according to the Example of this invention comprises three secret calculation devices 1 or 1' illustrated in FIG. 1 or FIG. 3. The three secret calculation devices are referred to as first secret calculation device 1C, second secret calculation device 2C, and third secret calculation device 3C, respectively.

When the bit W is distributed, a NOT thereof is calculated as follows while the bit W remains distributed.

The bit W uses three randomly selected bits R[1], R[2], and R[3] satisfying R[1]+R[2]+R[3]=0 mod 2. The first secret calculation device 1C stores (S[1],T[1])=(R[1],W+R [2] mod 2). The second secret calculation device 2C stores (S[2],T[2])=(R[2],W+R[3] mod 2). The third secret calculation device 3C stores (S[3],T[3])=(R[3],W+R[1] mod 2).

The first secret calculation device 1C calculates (S'[1],T' [1])=(S[1],T[1]+1 mod 2). The second secret calculation device 2C calculates (S'[2],T'[2])=(S[2],T[2]+1 mod 2). The third secret calculation device 3C calculates (S'[3],T'[3])= (S[3], T[3]+1 mod 2).

The first secret calculation device 1C, the second secret calculation device 2C, and the third secret calculation device 3C respectively hold the calculation results, and are thus considered to hold W'=W+1 mod 2 in a distributed manner. From those results, W' can be restored similarly to the original bit W.

(Calculation of AND)

Figure 11:
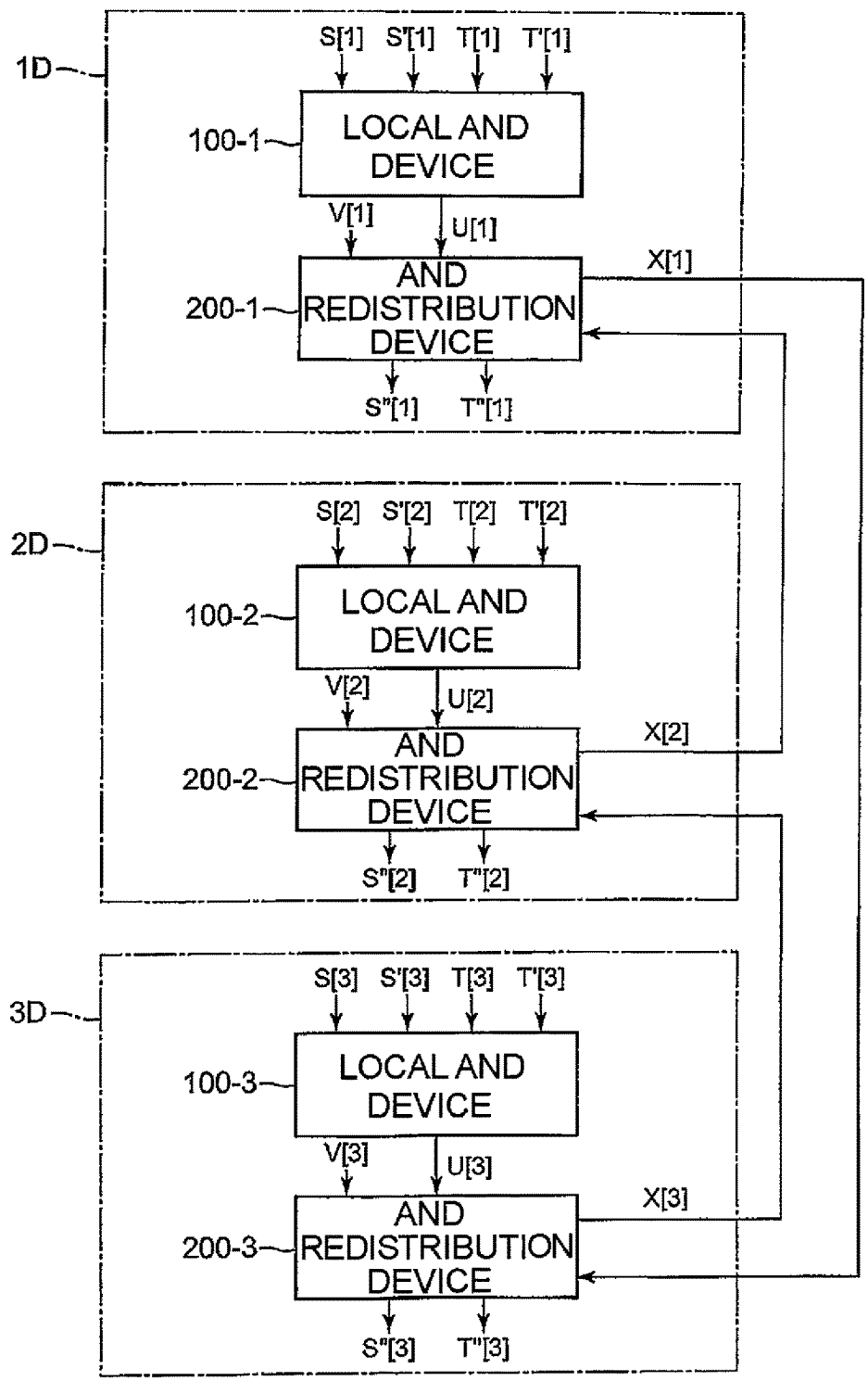
FIG. 11 is a block diagram for illustrating a configuration of the secret calculation system according to the Example for calculating, when the bit W and the bit W' are each distributed, an AND thereof while the bit W and the bit W' remain distributed.

As illustrated in FIG. 11, a secret calculation system according to the Example of this invention comprises three secret calculation devices 1 illustrated in FIG. 1. The three secret calculation devices are referred to as first secret calculation device 1D, second secret calculation device 2D, and third secret calculation device 3D, respectively. When the bit W and the bit W' are respectively distributed, the AND thereof is calculated as follows while the W and the bit W' remain distributed.

The bit W uses three randomly selected bits R[1], R[2], and R[3] satisfying R[1]+R[2]+R[3]=0 mod 2. The first secret calculation device 1D stores (S[1],T[1])=(R[1],W+R [2] mod 2). The second secret calculation device 2D stores (S[2],T[2])=(R[2],W+R[3] mod 2). The third secret calculation device 3D stores (S[3],T[3])=(R[3],W+R[1] mod 2).

The bit W' uses three randomly selected bits R'[1], R'[2], and R'[3] satisfying R'[1]+R'[2]+R'[3]=0 mod 2. The first secret calculation device 1D stores (S'[1],T'[1])=(R'[1],W'+ R'[2] mod 2). The second secret calculation device 2D stores (S'[2],T'[2])=(R'[2],W'+R'[3] mod 2). The third secret calculation device 3D stores (S'[3],T'[3])=(R'[3],W'+R'[1] mod 2).

The first to third secret calculation devices 1D, 2D, and 3D include the local AND devices 100 illustrated in FIG. 5 as first to third local AND devices 100-1, 100-2, and 100-3, respectively.

The first secret calculation device 1D is configured to supply, to the first local AND device 100-1, S[1] as the first input first element 101, T[1] as the first input second element 103, S'[1] as the second input first element 102, and T'[1] as the second input second element 104. As a result, the first local AND device 100-1 acquires U[1]=S[1]·S'[1]+T[1]·T' [1] mod 2 as the local AND element (first local AND element) 110.

The second secret calculation device 2D is also configured to similarly use the second local AND device 100-2 to acquire U[2]=S[2]·S'[2]+T[2]·T'[2] mod 2 as the local AND element (first local AND element) 110. The third secret calculation device 3D is also configured to similarly use the third local AND device 100-3 to acquire U[3]=S[3]·S'[3]+ T[3]·T'[3] mod 2 as the local AND element (first local AND element) 110.

The first to third secret calculation devices 1D, 2D, and 3D hold the calculation results, respectively, and are thus considered to hold W"=W·W' mod 2 in a distributed manner.

From those results, W" cannot be restored as in the original bit W or bit W'.

In order to directly restore W" from this result, W" only needs to be calculated as W"=U[1]+U[2]+U[3] mod 2. The following equation shows that W" can be restored.

$$U[1] + U[2] + U[3] = (S[1] \cdot S'[1] + T[1] \cdot T'[1]) +$$
$$(S[2] \cdot S'[2] + T[2] \cdot T'[2]) + (S[3] \cdot S'[3] + T[3] \cdot T'[3]) \bmod 2 =$$
$$3W \cdot W' + (W \cdot (R'[2] + R'[3] + R'[1])) +$$
$$(W' \cdot (R[2] + R[3] + R[1]) + (R[1] \cdot R'[1] + R[2] \cdot R'[2] + R[3] \cdot R'[3]) +$$
$$(R[2] \cdot R'[2] + R[3] \cdot R'[3] + R[1] \cdot R'[1]) \bmod 2 = W \cdot W' \bmod 2$$

$W \cdot W'$ is distributed to three values ($U[1], U[2], U[3]$).

Similarly, when (U'[1],U'[2],U'[3]) is acquired by distributing Z satisfying Z=U'[1]+U'[2]+U'[3] mod 2 to three values, W·W'+Z mod 2 is distributed to three values (U[1]+ U'[1] mod 2,U[2]+U'[2] mod 2,U[3]+U'[3] mod 2).

It is assumed that U[1] and U'[1] are held by the first secret calculation device 1D, U[2] and U'[2] are held by the second secret calculation device 2D, and U[3] and U'[3] are held by the third secret calculation device 3D. In this case, new distributed values can be calculated by the respective secret calculation devices without communicating to/from other secret calculation devices.

In other words, when a function is constructed by gates of the exclusive OR and the AND, a calculated result of the AND gate can be used to carry out the calculation in the exclusive OR gates for any number of times without the mutual communication before the calculated result is input to a next AND gate.

When an AND is calculated by using a result of the calculation of an AND, only the following processing needs to be carried out.

W" is distributed to three secret calculation devices similarly to the bit W and the bit W'. In this case, the first to third secret calculation devices 1D, 2D, and 3D include the AND redistribution devices 200 illustrated in FIG. 6 as first to third AND redistribution devices 200-1, 200-2, and 200-3, respectively.

V[1], V[2], and V[3] are randomly selected bits and serve as masks 201. Further, V[1], V[2], and V[3] satisfy V[1]+V[2]+V[3]=0 mod 2. Then, V[1] is passed in advance as the mask 201 to the first secret calculation device 1D. V[2] is passed in advance as the mask 201 to the second secret calculation device 2D. V[3] is passed in advance as the mask 201 to the third secret calculation device 3D. The first to third secret calculation devices 1D, 2D, and 3D supply the passed masks 201 to the first to third AND redistribution devices 200-1, 200-2, and 200-3, respectively.

The third secret calculation device 3D calculates an exclusive OR of the local AND element 202 and the mask 201 as X[3]=U[3]+V[3] mod 2 in the first exclusive OR circuit 203. Then, the third secret calculation device 3D transmits the first exclusive OR result X[3] as a first OR 205 from the communication device 204 to the second secret calculation device 2D.

The second secret calculation device 2D also similarly generates X[2]=U[2]+V[2] mod 2 as the first OR 205, and transmits X[2] to the first secret calculation device 1D. The first secret calculation device 1D also similarly generates X[1]=U[1]+V[1] mod 2 as the first OR 205, and transmits X[1] to the third secret calculation device 3D.

The first to third secret calculation devices 1D, 2D, and 3D receive the first ORs X[2], X[3], and X[1] as the received first OR 207 from the communication devices 204 of the respective first to third AND redistribution devices 200-1, 200-2, and 200-3, respectively.

Each of the first to third AND redistribution devices 200-1, 200-2, and 200-3 calculates an exclusive OR of the received first OR 207 and the first OR 205 by the second exclusive OR circuit 206, thereby generating the output second element 209. Moreover, the first OR 205 is produced as the output first element 208 via the signal line 210.

As a result, the first secret calculation device 1D generates (T"[1],S"[1])=(X[1]+X[2] mod 2,X[1]) as the output second element 209 and the output first element 208, respectively. The second secret calculation device 2D generates (T"[2],S"[2])=(X[2]+X[3] mod 2,X[2]) as the output second element 209 and the output first element 208, respectively. The third secret calculation device 3D generates (T"[3],S"[3])=(X[3]+X[1] mod 2,X[3]) as the output second element 209 and the output first element 208, respectively.

The fact that W" can be restored from the two secret calculation devices similarly to W and W' can be described without loss of generality based on the restoration method in a case where the first secret calculation device 1D and the second secret calculation device 2D cooperate with each other.

The following calculation can be carried out by using S"[1] from the first secret calculation device 1D and T"[2] from the second secret calculation device 2D.

$$W \cdot W' = S''[1] + T''[2] \bmod 2$$
$$= U[1] + V[1] + U[2] + V[2] + U[3] + V[3] \bmod 2$$
$$= U[1] + U[2] + U[3] \bmod 2$$
$$= W''$$

and $$T''[1] + T''[2] + T''[3] \bmod 2 =$$
$$2 \cdot (U[1] + U[2] + U[3] + V[1] + V[2] + V[3]) = 0 \bmod 2$$

It is thus appreciated that W" is distributed similarly to W and W'.

(Calculation of Random Number)

In FIG. 11, the first to third secret calculation devices 1D, 2D, and 3D hold the random bits V[1], V[2], and V[3], respectively, which satisfy V[1]+V[2]+V[3]=0 mod 2. A set of such random bits is required each time one AND is calculated.

Figure 12:
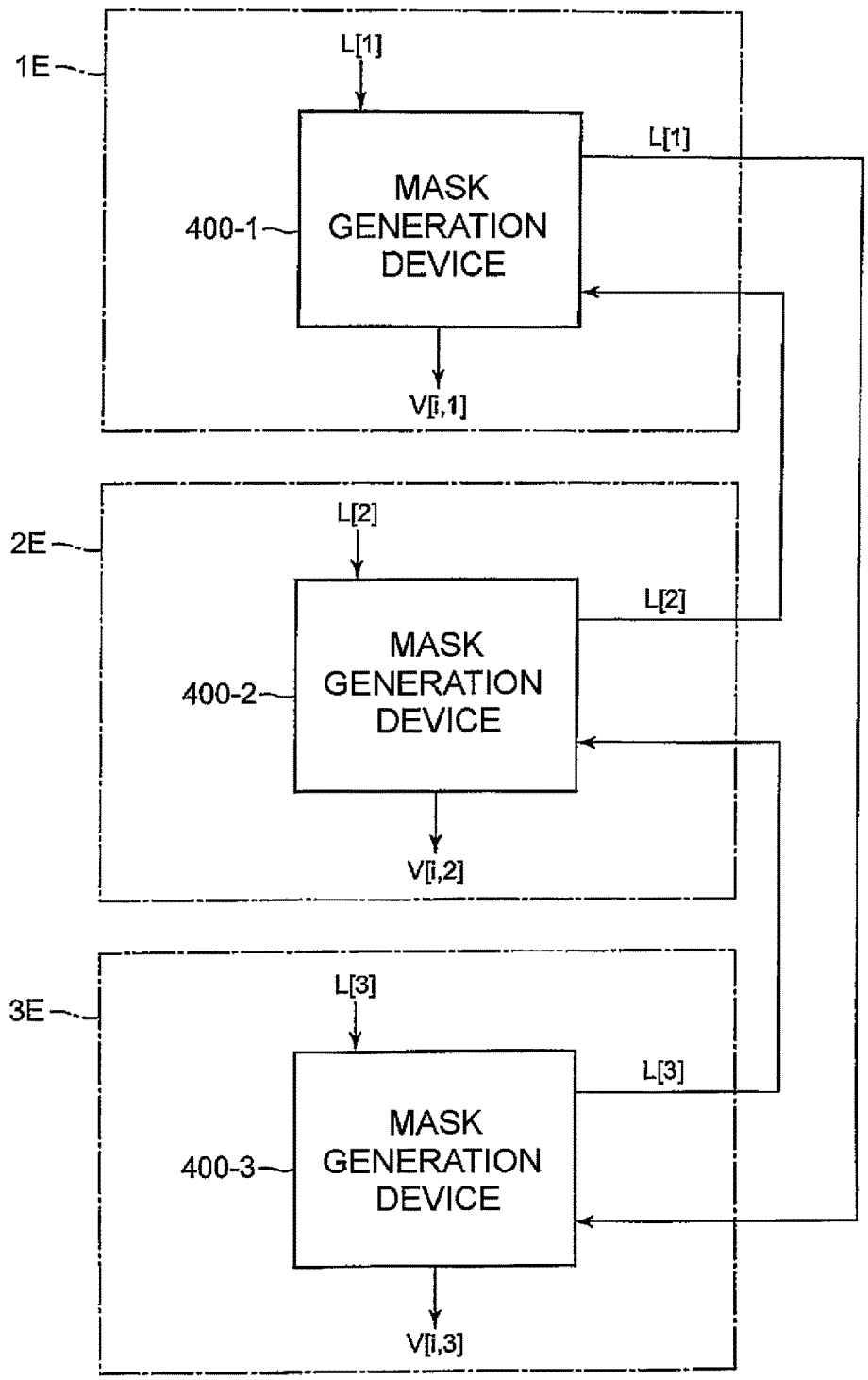
FIG. 12 is a block diagram for illustrating a configuration of the secret calculation system acquired by changing the secret calculation system illustrated in FIG. 11 such that the secret calculation system can calculate a large amount of ANDs.

Referring to FIG. 12, a description will be given of a method of generating, by using the mask generation devices 400 as follows, V[i,1], V[i,2], and V[i,3] satisfying V[i,1]+V[i,2]+V[i,3]=0 mod 2 for a large number of i=1, N when calculating a large amount of ANDs.

As illustrated in FIG. 12, a secret calculation system according to the Example of this invention comprises three secret calculation devices 1' illustrated in FIG. 3. The three secret calculation devices are referred to as first secret calculation device 1E, second secret calculation device 2E, and third secret calculation device 3E, respectively.

The first to third secret calculation devices 1E, 2E, and 3E include components of the first to third secret calculation devices 1D, 2D, and 3D illustrated in FIG. 11, respectively, but the components are not required in the following description, and are thus not shown. The first to third secret calculation devices 1E, 2E, and 3E include the mask generation devices 400 illustrated in FIG. 7 as first to third mask generation devices 400-1, 400-2, and 400-3, respectively.

K is a safety variable. The first to third secret calculation devices 1E, 2E, and 3E are configured to generate keys L[1], L[2], and L[3] of K bits as the keys 401, respectively. The first secret calculation device 1E is configured to transmit the key L[1] to the third secret calculation device 3E, the second secret calculation device 2E is configured to transmit the key L[2] to the first secret calculation device 1E, and the third secret calculation device 3E is configured to transmit the key L[3] to the second secret calculation device 2E. Thus, the first secret calculation device 1E, the second secret calculation device 2E, the third secret calculation device 3E are configured to receive the keys L[2], L[3], and L[1] from the second secret calculation device 2E, the third secret calculation device 3E, and the first secret calculation device 1E, respectively.

In the first to third secret calculation devices 1E, 2E, and 3E, the first to third mask generation devices 400-1, 400-2, and 400-3 are configured to receive the received keys L[2], L[3], and L[1] as the received keys 410.

A PRG is a pseudorandom number generator for producing a string of N bits from a string of the K bits.

In the first mask generation device 200-1 of the first secret calculation device 1E, the first pseudorandom number generator 402 generates the first pseudorandom number 405 as PRG(L[1]) from the key 401. Moreover, the second pseudo number generator 404 generates the second pseudorandom number 406 as PRG(L[2]) from the received key 410. Then, the exclusive OR circuit 409 calculates bitwise exclusive ORs of the PRG(L[1]) and the PRG(L[2]), thereby generating a random number 407 of N bits. An ith bit from a first bit of this random number 407 is denoted by V[i.1].

The second secret calculation device 2E similarly calculates bitwise exclusive ORs of a first pseudorandom number PRG(L[2]) and a second pseudorandom number PRG(L[3]), thereby generating a string (random number) 407 of N bits. An ith bit from a first bit of this string 407 is denoted by V[i.2].

The third secret calculation device 3E similarly calculates bitwise exclusive ORs of a first pseudorandom number PRG(L[3]) and a second pseudorandom number PRG(L[1]), thereby generating the string (random number) 407 of N bits. An ith bit from a first bit of this string 407 is denoted by V[i.3].

(Method for Application to Arbitrary Function)

It is known that all functions for inputting a bit string and outputting a bit string can be constructed bitwise of ORs and ANDS including input of constants. Thus, all of the functions can be calculated while all pieces of data remain distributed by using the above-mentioned calculation methods for the OR and the AND.

A description will be now given of effects of the Example of this invention.

With this secret calculation method, the OR of two bits distributed to and held by three secret calculation devices can be held in the form of the distribution to the three secret calculation devices by those secret calculation devices calculating without mutual communication. The method of holding the resulting bit is the same as the method of holding each of the two initial bits.

Further, the AND of two bits distributed to and held by three secret calculation devices can be held in the form of the distribution to the three secret calculation devices by those secret calculation devices calculating while communicating to/from one another. The communication carried out on this occasion is only the communication required for generating the random bits V[1], V[2], and V[3], which are the three bits as a whole, and is far less than the communication required for the secret calculation between two devices disclosed in Non Patent Document 2. The method of holding the resulting bit is the same as the method of holding each of the two initial bits.

In this way, the result of the calculation is held by the same method as that of holding the respective bits before the calculation for both the AND and the OR, and the calculation of the AND and the OR can further be continued for the result. In other words, an arbitrary function constructed by the ORs and the ANDs can be calculated with a small amount of communication among the three secret calculation devices while the data remains distributed. As a result, a calculation amount required for each of the AND and the OR is six or three times that of a calculation amount required for calculating the simple AND or OR. This secret calculation method is effective when calculation is carried out without disclosing the data to the respective secret calculation devices.

As described above, with this invention, data is distributed to a plurality of secret calculation devices, and an arbitrary function can be calculated while the data remains hidden from the respective secret calculation devices. Moreover, the communication amount and the calculation amount required for this calculation are small. As a result, when secret data is handled in a certain secret calculation device to provide a certain service, an administrator of the secret calculation device is prevented from stealing data. This is because when different administrators are assigned to a plurality of secret calculation devices, a single administrator no longer sees the data in all the secret calculation devices. This invention contributes to preventing the data from being stolen by the administrator in this way.

This invention is not strictly limited to the above-mentioned example embodiments and Example, and may be embodied while the components are modified without departing from the gist thereof on an embodiment stage of the above-mentioned example embodiments and Example. Moreover, various inventions may be formed by properly combining a plurality of components. For example, according to the Example, a description is given of the case where the three secret calculation devices exist. However, it should be understood that in general, as illustrated in FIG. 2 and FIG. 4, this invention can be applied in the same way to the case where the number of the secret calculation devices is N (N is an integer equal to or more than 3).

In other words, according to this invention, an arbitrary function can be calculated at high speed while data remains distributed to a plurality of secret calculation devices, and is not disclosed to any of the secret calculation devices.

The method described in this invention can be carried out by a computer. A program caused to carry out the method may be stored for distribution in a recording medium such as a magnetic disk, for example, a floppy (trademark) disk and a hard disk, an optical disc, for example, a compact disc-read only memory (CD-ROM) and a digital versatile disc (DVD), an optical magnetic disk (MO), and a semiconductor memory.

Moreover, as long as the recording medium can store a program and can be read by a computer, a storage form thereof may be any form.

Moreover, an operating system, middleware such as database management software and network software, or the like operating on a computer may carry out a part of the respective pieces of the processing based on instructions of a program installed on the computer from the recording medium.

Further, the recording medium according to this invention is not limited to a medium independent of the computer, and includes a recording medium for storing or temporarily storing a downloaded program transmitted via a local area network (LAN), the Internet, or the like.

Moreover, the number of the recording media is not limited to one. A case where processing in the above-mentioned embodiments is carried out from a plurality of media is included in the recording medium according to this invention, and a medium configuration may be any configuration.

The computer according to this invention carries out the respective pieces of processing based on programs stored in a recording medium, and may include any configuration such as an apparatus constructed by a personal computer or a system in which a plurality of apparatus are connected to each other via a network.

Moreover, the computer according to this invention is not limited to a personal computer. The computer includes an arithmetic processing apparatus included in an information processing apparatus, and is a device or apparatus capable of implementing the functions of this invention through use of a program.

The whole or part of the example embodiments disclosed above can be described as, but not limited to, the following supplementary notes.

(Supplementary Note 1) A secret calculation device, comprising:

a local AND device configured to receive at least two one-bit input elements to produce a first local AND element; and an AND redistribution device configured to receive a one-bit mask and a second local AND element acquired by calculating an exclusive OR of the first local AND element and P bits, where P is an integer equal to or more than 0, to calculate a first OR, and to communicate to/from an AND redistribution device of another secret calculation device to produce at least one one-bit output element.

(Supplementary Note 2) The secret calculation device according to Supplementary Note 1,
further comprising a mask generation device configured to communicate to/from a mask generation device of the another secret calculation device, and to use a key to generate a random number,
wherein one bit selected from the random number is supplied as the one-bit mask to the AND redistribution device.

(Supplementary Note 3) The secret calculation device according to Supplementary Note 1 or 2, wherein:
the local AND device is supplied with a first input first element of one bit, a first input second element of one bit, a second input first element of one bit, and a second input second element one bit; and
wherein the local AND device comprises:
a first AND circuit configured to calculate an AND of the first input first element and the second input first element to produce a result of the AND as a first AND;
a second AND circuit configured to calculate an AND of the first input second element and the second input second element to produce a result of the AND as a second AND; and
a first exclusive OR circuit configured to calculate an exclusive OR of the first AND and the second AND to produce a result of the exclusive OR as the first local AND element.

(Supplementary Note 4) The secret calculation device according to Supplementary Note 1 or 2, wherein the AND redistribution device comprises:
a first exclusive OR circuit configured to calculate an exclusive OR of the one-bit mask and the second local AND element to produce a result of the exclusive OR as the first OR;
a communication device configured to transmit the first OR to an AND redistribution device of a first another secret calculation device, and receive, as a received first OR, a first OR generated by an AND redistribution device of a second another secret calculation device from the AND redistribution device of the second another secret calculation device;
means for producing the first OR as an output first element; and
a second exclusive OR circuit configured to calculate an exclusive OR of the first OR and the received first OR to produce a result of the exclusive OR as an output second element.

(Supplementary Note 5) The secret calculation device according to Supplementary Note 2, wherein the mask generation device comprises:
a first pseudorandom number generator configured to generate a first pseudorandom number from the key;
a communication device configured to transmit the key to a mask generation device of a first another secret calculation device, and receive, as a received key, the key from a mask generation device of a second another secret calculation device;
a second pseudorandom number generator configured to generate a second pseudorandom number from the received key; and
an exclusive OR circuit configured to calculate a bitwise exclusive OR of the first pseudorandom number and the second pseudorandom number to produce a result of the exclusive OR as the random number.

(Supplementary Note 6) A secret calculation system, comprising first to Nth secret calculation devices, where N is an integer equal to or more than 3,
the first to Nth secret calculation devices comprising the local AND devices of Supplementary Note 1 and the AND redistribution devices of Supplementary Note 1 as first to Nth local AND devices and first to Nth AND redistribution devices, respectively, wherein:
the first AND redistribution device of the first secret calculation device is configured to transmit the first OR to the Nth AND redistribution device of the Nth secret calculation device; and
an nth AND redistribution device of an nth secret calculation device, where 2≤n≤N, is configured to transmit the first OR to an (n−1)th AND redistribution device of an (n−1)th secret calculation device.

(Supplementary Note 7) A secret calculation system, comprising first to Nth secret calculation devices, where N is an integer equal to or more than 3,
the first to Nth secret calculation devices comprising the local AND devices of Supplementary Note 2, the AND redistribution devices of Supplementary Note 2, and the mask generation devices of Supplementary Note 2 as first to Nth local AND devices, first to Nth AND redistribution devices, and first to Nth mask generation devices, respectively, wherein:
the first AND redistribution device of the first secret calculation device is configured to transmit the first OR to the Nth AND redistribution device of the Nth secret calculation device;
an nth AND redistribution device of an nth secret calculation device, where 2≤n≤N, is configured to transmit the first OR to an (n−1)th AND redistribution device of an (n−1)th secret calculation device;
the first mask generation device of the first secret calculation device is configured to transmit the key to the Nth mask generation device of the Nth secret calculation device; and
an nth mask generation device of an nth secret calculation device is configured to transmit the key to an (n−1)th mask generation device of the (n−1)th secret calculation device.

(Supplementary Note 8) A secret calculation method, comprising the steps of:
receiving at least two one-bit input elements to produce a first local AND element; and
receiving a one-bit mask and a second local AND element acquired by calculating an exclusive OR of the first local AND element and P bits, where P is an integer equal to or more than 0, calculating a first OR, and communicating to/from an AND redistribution device of another secret calculation device to produce at least one one-bit output element.

(Supplementary Note 9) The secret calculation method according to Supplementary Note 8, further comprising the steps of:
communicating to/from a mask generation device of the another secret calculation device, and using a key to generate a random number; and
supplying one bit selected from the random number as the one-bit mask.

(Supplementary Note 10) A secret calculation method, which is performed in a secret calculation system comprising first to Nth secret calculation devices, where N is an integer equal to or more than 3,
the secret calculation system comprising the local AND devices of Supplementary Note 1 and the AND redistribution devices of Supplementary Note 1 as first to Nth local AND devices and first to Nth AND redistribution devices, respectively, the secret calculation method comprising the steps of:
transmitting, by the first AND redistribution device of the first secret calculation device, the first OR to the Nth AND redistribution device of the Nth secret calculation device; and transmitting, by an nth AND redistribution device of an nth secret calculation device, where 2≤n≤N, the first OR to an (n−1)th AND redistribution device of an (n−1)th secret calculation device.

(Supplementary Note 11) A secret calculation method, which is performed in a secret calculation system comprising first to Nth secret calculation devices, where N is an integer equal to or more than 3,
the first to Nth secret calculation devices comprising the local AND devices of Supplementary Note 2, the AND redistribution devices of Supplementary Note 2, and the mask generation devices of Supplementary Note 2 as first to Nth local AND devices, first to Nth AND redistribution devices, and first to Nth mask generation devices, respectively,
the secret calculation method comprising the steps of:
transmitting, by the first AND redistribution device of the first secret calculation device, the first OR to the Nth AND redistribution device of the Nth secret calculation device;

transmitting, by an nth AND redistribution device of an nth secret calculation device, where 2≤n≤N, the first OR to an (n−1)th AND redistribution device of an (n−1)th secret calculation device;

transmitting, by the first mask generation device of the first secret calculation device, the key to the Nth mask generation device of the Nth secret calculation device; and transmitting, by an nth mask generation device of an nth secret calculation device, the key to an (n−1)th mask generation device of the (n−1)th secret calculation device.

(Supplementary Note 12) A computer-readable recording medium having recorded thereon a secret calculation program for causing a computer to implement the functions of:
receiving at least two one-bit input elements to produce a first local AND element; and receiving a one-bit mask and a second local AND element acquired by calculating an exclusive OR of the first local AND element and P bits, where P is an integer equal to or more than 0, calculating a first OR, and communicating to/from an AND redistribution device of another secret calculation device to produce at least one one-bit output element.

(Supplementary Note 13) The computer-readable recording medium according to Supplementary Note 12, wherein the secret calculation program further causes the computer to implement the functions of:
communicating to/from a mask generation device of the another secret calculation device, and using a key to generate a random number; and supplying one bit selected from the random number as the one-bit mask.

REFERENCE SIGNS LIST 1,1' secret calculation device
1-1, 1'-1, 1A to 1E first secret calculation device
1-2,1'-2, 2A to 2E second secret calculation device
3A to 3E third secret calculation device
1-N, 1'-N Nth secret calculation device
100 local AND device
100-1 first local AND device
100-2 second local AND device
100-3 third local AND device
101 first input first element
102 second input first element
103 first input second element
104 second input second element
105 first AND circuit
106 second AND circuit
107 exclusive OR circuit
108 first AND
109 second AND
110 local AND element (first local AND element)
200 AND redistribution device
200-1 first AND redistribution device
200-2 second AND redistribution device
200-3 third AND redistribution device
201 mask
202 local AND element (second local AND element)
203 first exclusive OR circuit
204 communication device
205 first OR
206 second exclusive OR circuit
207 received first OR
208 output first element
209 output second element
210 signal line
300 exclusive OR circuit
400 mask generation device
400-1 first mask generation device
400-2 second mask generation device
400-3 third mask generation device
401 key
402 first pseudorandom number generator
403 communication device
404 second pseudorandom number generator
405 first pseudorandom number
406 second pseudorandom number
407 random number
409 exclusive OR circuit
410 received key

The invention claimed is:

1. A secret calculation method, which is performed in a secret calculation system comprising first to Nth secret calculation devices, where N is an integer equal to or greater than 3,
the first to Nth secret calculation devices comprising first to Nth local AND devices and first to Nth AND redistribution devices, respectively,
each of the first to Nth local AND devices being configured to:
calculate a first AND, the first AND being AND of a first element in a first input and a first element in a second input;
calculate a second AND, the second AND being AND of a second element in the first input and a second element in the second input; and
calculate a first local AND element, the first local AND element being an exclusive OR of the first AND and the second AND,
each of the first to Nth AND redistribution devices being configured to:
calculate a first OR, the first OR being an exclusive OR of a mask and a second local AND element and the second local AND element being an exclusive OR of the first local AND element and P bit, where P is an integer equal to or greater than 0;

transmit the first OR to a first other secret calculation device;

receive a received first OR from a second other secret calculation device;

output the first OR as a first output element;

calculate a second output element, the second output element being an exclusive OR of the first OR and the received first OR; and output the second output element, the secret calculation method comprising:

transmitting, by the first AND redistribution device of the first secret calculation device, the first OR to the Nth AND redistribution device of the Nth secret calculation device; and transmitting, by an nth AND redistribution device of an nth secret calculation device, where $2 \leq n \leq N$, the first OR to an (n−1)th AND redistribution device of an (n−1)th secret calculation device.

2. A secret calculation method, which is performed in a secret calculation system comprising first to Nth secret calculation devices, where N is an integer equal to or greater than 3, the first to Nth secret calculation devices comprising first to Nth local AND devices, first to Nth AND redistribution devices, and first to Nth mask generators, respectively, each of the first to Nth local AND device being configured to:

calculate a first AND, the first AND being AND of a first element in a first input and a first element in a second input;

calculate a second AND, the second AND being AND of a second element in the first input and a second element in the second input; and calculate a first local AND element, the first local AND element being an exclusive OR of the first AND and the second AND, each of the first to Nth AND distribution devices being configured to:

calculate a first OR, the first OR being an exclusive OR of a mask and a second local AND element and the second local AND element being an exclusive OR of the first local AND element and P bit, where the P is an integer equal to or greater than 0;

transmit the first OR to a first other secret calculation device;

receive a received first OR from a second other secret calculation device;

output the first OR as a first output element;

calculate a second output second element, the second output element being an exclusive OR of the first OR and the received first OR; and output the second output element, each of the first to Nth mask generators being configured to:

generate a first pseudorandom number in response to a key;

transmit the key to a mask generator of the another secret calculation device;

receive a received key from a mask generator of the another secret calculation device;

generate a second pseudorandom number in response to the received key; and calculate a bitwise exclusive OR of the first pseudorandom number and the second pseudorandom number to produce a result of the exclusive OR as a random number, one bit selected from the random number being supplied as the mask to each of the first to Nth AND redistribution devices, the secret calculation method comprising:

transmitting, by the first AND redistribution device of the first secret calculation device, the first OR to the Nth AND redistribution device of the Nth secret calculation device;

transmitting, by an nth AND redistribution device of an nth secret calculation device, where $2 \leq n \leq N$, the first OR to an (n−1)th AND redistribution device of an (n−1)th secret calculation device;

transmitting, by the first mask generator of the first secret calculation device, the key to the Nth mask generator of the Nth secret calculation device; and transmitting, by an nth mask generator of an nth secret calculation device, the key to an (n−1)th mask generator of the (n−1)th secret calculation device.

* * * * *